Feb. 6, 1968 B. BARÉNYI 3,367,710
MOTOR VEHICLE
Filed Nov. 22, 1965 3 Sheets-Sheet 1
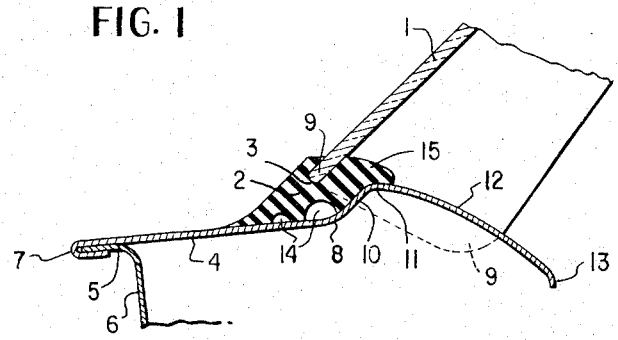
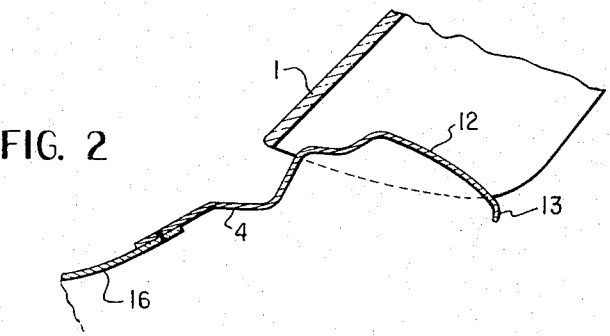
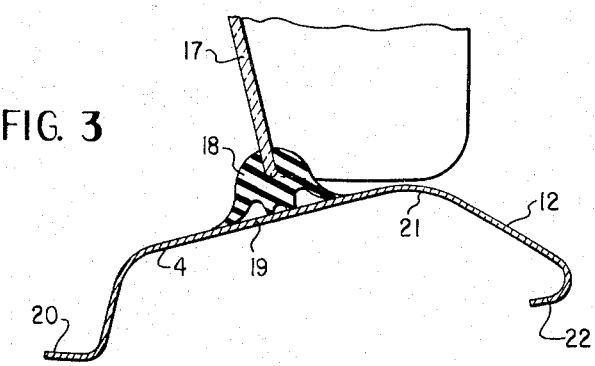
INVENTOR
BÉLA BARÉNYI

INVENTOR
BÉLA BARÉNYI

United States Patent Office 3,367,710
Patented Feb. 6, 1968

3,367,710
MOTOR VEHICLE
Béla Barényi, Stuttgart-Vaihingen, Germany, assignor to Daimler-Benz Aktiengesellschaft, Stuttgart-Untertürkheim, Germany
Filed Nov. 22, 1965, Ser. No. 508,934
Claims priority, application Germany, Nov. 21, 1964, D 45,894
10 Claims. (Cl. 296—84)

ABSTRACT OF THE DISCLOSURE

A sheet metal body panel for motor vehicles forming at least in part a dashboard for the vehicle which is disposed in the area of the lower edge of the windshield and projects into the passenger space in a freely-supported, cantilever-like manner.

The present invention relates to the construction of a sheet metal body panel for motor vehicles within the area of the lower edge, preferably of the windshield.

Many types of constructions for the sheet metal body panels or body parts are known in the prior art which extend from the engine hood or the like to the instrument panel or dashboard. These prior art body panels or parts are, as a rule, composed of several pieces which form within the area of the windowpane, a flange having a sharp edge over which is drawn the sealing section or profile for the windowpane. However, constructions are also known in the prior art in which the sharp-edged flange is dispensed with within the area of the pane but which are provided instead at still more unfavorable places with reinforcing flanges causing possible injuries during collisions. With numerous vehicles a padded surface is disposed above the instrument panel whose padding extends approximately to the windshield. This padding lessens injuries to a certain extent upon impact of body parts, especially of the heads of the passengers. However, as a rule, sharp-edged and strongly supporting constructions are arranged at the body sheet metal panels below this padding so that a yielding at these places in case of accidents is practically not possible. Furthermore, the paddings are not able to absorb deformation work and therewith to lessen the impact energy.

The present invention is concerned with the task of achieving a construction of the sheet metal parts or panels within the area of the instrument panel and thereabove which is satisfactory from a safety point of view, and to avoid sharp-edged constructions as well as to create the possibility of effecting satisfactory deformation in order to be able to dissipate and nullify as large as possible a proportion of the impact energy of impinging body parts in case of accidents. Nevertheless, a completely satisfactory seal of the windowpane as well as a good air guidance should be possible. Moreover, the construction of the sheet metal parts is to be made in such a manner that in case of impact they are able to adapt themselves as rapidly as possible and as easily as possible to the shape of the impinging body parts in order to thus prevent injuries to an even greater extent.

The present invention essentially consists in a construction wherein the end portion of the sheet metal part or panel extending in a cantilever or self-supporting manner below the windowpane into the passenger space slopes downwardly in a desk-like manner in the direction toward the passengers and any existing knife-edge-like window mountings, frames, or supports are disposed lower than the large, desk-like surface. Such a sheet metal part or panel may deform in case of impact of body parts, especially of the heads of passengers during accidents in a very advantageous manner and may thereby absorb large energies. Its deformation is not prevented by any supports disposed in the direction toward the passengers and also is not provided with any sharp-edged parts leading to injuries.

According to one advantageous construction of the present invention, the sheet metal part or panel may rise slightly up to a point shortly behind the windowpane and may then slope off again downwardly. Additionally, the body sheet metal part or panel according to a particularly favorable further development of the present invention may overlap from above a freely supported, upwardly extending instrument panel secured only from below and possibly provided with appropriate knee protection. It is also prevented thereby that the sharp or possibly rigid upper edge of the instrument panel leads to injuries in case of accidents since both the instrument panel as well as the upper sheet metal body panel may readily yield and any sharp-edged constructions are covered by the desk-like sheet metal part. In order to be able to carry completely satisfactorily a particularly large and heavy front or rear window on which is arranged a sheet metal part or panel formed in accordance with the present invention, provision may be made that the windowpane rests on, embossments or the like, arranged at a distance from one another, preferably disposed only at the ends of the windowpane, and located lower than the desk-like surface. Moreover, the windowpane may also be supported on the embossments or the like by means of continuous Z-shaped rails.

Accordingly, it is an object of the present invention to provide a body construction for motor vehicles and more particularly a sheet metal panel construction for use within the area of the lower edge of a windowpane which eliminates, by simple means, the aforementioned shortcomings and drawbacks encountered with the prior art constructions.

Another object of the present invention resides in the provision of sheet metal panels extending from the engine hood to the dashboard or instrument panel which dispenses with the need of sharp-edged flanges and permits a ready yielding in case of accidents so as to minimize injuries to the passengers.

A further object of the present invention resides in the provision of sheet metal body panels or parts extending from within the area of the lower edge of the windshield into the passenger compartment which not only avoid sharp edges that might lead to injuries of the passengers in case of accidents but which are also capable of absorbing deformation work and therewith lessen the impact energy of body parts.

Still another object of the present invention resides in the provision of a sheet metal body panel construction of the type mentioned above which achieves the aforementioned aims and objects, yet permits a completely satisfactory seal of the windowpane as well as possibly a good air guidance for the ventilation of the vehicle.

Another object of the present invention resides in the provision of a sheet metal body panel arrangement extending from the lower edge of the windshield into the passenger space which effectively protects any sharp edges that may exist in the dashboard or instrument panel while at the same time readily absorbing the impact energy of body parts impinging thereagainst.

These and other objects, features, and advantages of the present invention will become more obvious from the following description when taken in connection with the accompanying drawing, which shows, for purposes of illustration only, several embodiments in accordance with the present invention, and wherein:

FIGURE 1 is a partial longitudinal, cross-sectional view through a first embodiment of a passenger motor vehicle in accordance with the present invention within the area of the lower edge of the windshield.

FIGURE 2 is a partial cross-sectional view, similar to FIGURE 1, through a second embodiment of a motor vehicle in accordance with the present invention within the area of the lower edge of the windshield.

FIGURE 3 is a partial cross-sectional view, similar to FIGURE 1, through a third embodiment of a motor vehicle in accordance with the present invention.

Figure 4:
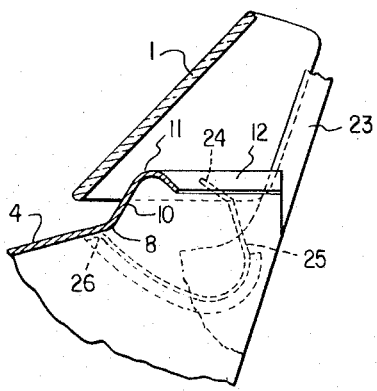
FIGURE 4 is a partial cross-sectional view, similar to FIGURE 1, through a fourth embodiment of a motor vehicle in accordance with the present invention.

Referring now to the drawing wherein like reference numerals are used throughout the various views to designate like parts, reference numeral 1 designates in each case the windshield of the motor vehicle. In the various longitudinal, cross-sectional views, which illustrate in each case only the lower edge of a windshield 1 and the parts directly adjoining the same, exclusively the lines lying within the cross-sectional plane are illustrated for sake of clarity with the exception of FIGURES 4 and 8. Only of the windshields 1 also the boundary lines disposed to the rear of the cross-sectional plane are indicated for a clearer illustration.

In the construction according to FIGURE 1, a mounting and sealing sectional member 2 is drawn over the lower end of the windshield 1. The windshield 1 thereby rests in a groove 3 of the sectional member 2. A sheet metal body panel 4 extends underneath the sectional member 2 which is secured at the bent-off flange 5 of the firewall 6 by means of the bent-over flanging 7 thereof. The sheet metal panel 4 rises slightly approximately rectilinearly from the securing place thereof in the direction toward the windshield 1 up to the corner or bent-off place 8. The corner or bent-off place 8 lies somewhat inside and to the rear of the lower windshield edge 9. A leg portion 10 of the panel 4 rises considerably more steeply than in the preceding section from the corner or bent-off place 8 up to a further corner or bent-off place 11 whereby the leg portion 10 extends approximately parallel to the windshield 1. The sheet metal body panel 4 slopes downwardly with a slight curvature from the corner 11 in the direction toward the passenger space and forms a large desk-like surface 12 whose rim 13 facing the passenger space is slightly bent over. The sectional sealing member 2 is matched to the construction of the sheet metal body panel 4, rests with its pointed tongue in the forward portion thereof on the panel 4, forms two hollow spaces 14 and seals between the leg portion 10 and the lower windshield edge 9 whereby the sectional sealing member 2 extends with the lip 15 thereof over the bent-off place or corner 11 and thus improves the seal and mounting support.

The sheet metal body panel 4 is constructed in a cantilever-like manner, i.e., freely supported. Upon impact of body parts of the passengers in case of accidents, the desk-like surface 12 can adapt itself very rapidly to the shape of the impinging body part and yields under absorption of deformation work. Since the body panel 4 is not supported within the area of the passengers, it cannot form any sharp edges during deformations which may lead to considerable injuries. By reason of the presence of a rising section up to a point to the rear of the forward edge of the windshield 1, no water can also penetrate into the passenger space and water that might possibly collect in small quantities can readily drain off.

The construction according to FIGURE 2 differs from that of FIGURE 1 in that the sheet metal body panel 4 is not secured at the firewall, as in FIGURE 1, but at a part of the engine space cover or lid 16 by spot-welding and is further provided within the area of the lower edge of the windshield 1 with an additional undulation.

The embodiment according to FIGURE 3, in contrast to the other embodiments, illustrates a windshield 17 inclined upwardly outwardly whose sectional mounting member 18 is of symmetrical construction. The windshield 17 rests perpendicularly on the surface 19 of the panel 4 rising from in front toward the rear thereof whose fastening and securing within the area of the leg portion 20 is of any conventional manner, not illustrated herein. The surface 19 rises up to a point to the rear of the windshield 17 and is thereafter provided with a curved portion 21. The desk-like surface 12 adjoins the curved portion 21. The bent-off portion 22 at the inner end of the body panel 4 is drawn over by a greater amount than the bent-off portions 13 of FIGURES 1 and 2. Also, this body panel 4, secured only within the area of the flange 20 may yield completely satisfactorily upon impact of body parts of the passengers. The sealing strip 18 is retained completely satisfactorily notwithstanding the absence of any undulated constructions or leg portions in the panel 4 since the windshield 17 rests normal on the surface 19.

Figure 5:
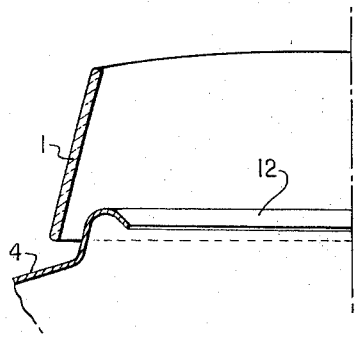
FIGURE 5 is a transverse cross-sectional view through a passenger motor vehicle according to FIGURE 4 within the area of the strongly curved windshield as viewed in the direction toward the windshield, whereby the instrument panel is omitted for the sake of clarity.

The embodiment according to FIGURES 4 and 5 shows a sheet metal panel 4 extending from the engine space cover and secured only within this area, which panel 4 rises slightly up to the bent-off place or corner 8 and thereafter rises more pronouncedly in the leg portion 10 in order to pass over at corner 11 into the desk-like surface 12. A part of the door column 23 is additionally illustrated, lying behind the plane of the cross section of FIGURE 4. The windshield 1 is secured at the door column 23 in a conventional manner. The desk-like surface 12 extends over the upper edge 24 of an instrument panel 25 illustrated only in FIGURE 4 in dash-line. The instrument panel 25 is secured only with its leg portion 26 at the sheet metal panel 4 so that also the upper end 24 of the instrument panel 25 is self-supporting, i.e., arranged in cantilever fashion. The upper end 24 of the instrument panel 25 is covered by the desk-like surface 12. Consequently, in case of accidents, no reinforcement between the desk-like surface 12 and the instrument panel 25 results within the impact area which might lead to injuries of the passengers.

With the embodiment according to FIGURE 2 as well as FIGURES 4 and 5, no sealing strip is illustrated since the gap formed between the panel 4 and the windshield 1 may be utilized for purposes of air admission. Appropriate conventional means (not illustrated) may be installed into this gap for the temporary sealing or closing of the gap. Since such means are well known in the art and form no part of the present invention, a detailed description and illustration thereof is dispensed with herein.

Figure 6:
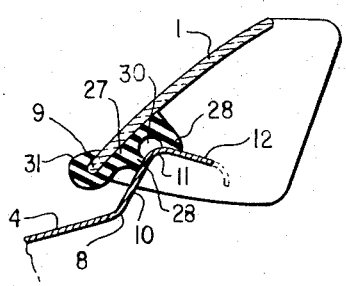
FIGURE 6 is a partial cross-sectional view, similar to FIGURE 4, through a fifth embodiment of a motor vehicle in accordance with the present invention.
Figure 7:
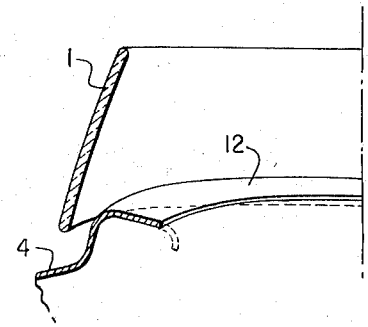
FIGURE 7 is a transverse cross-sectional view through the vehicle according to FIGURE 6 as viewed in the direction toward the windshield.

The embodiment according to FIGURES 6 and 7 shows a sheet metal panel 4 secured, in a manner similar to the panel 4 of FIGURES 4 and 5, only within the area of its forward portion thereof and provided with two bent-off places or corners 8 and 11 as well as with the leg portion 10 whereby, however, the desk-like surface 12 of FIGURES 6 and 7 has a somewhat different shape. The sealing strip 27 is supported on the panel 4 merely on both sides of the bent-off place or corner 11 by means of its lips 28 and 29 under formation of a hollow space 30 and extends with the lip 31 thereof over the lower windshield rim 9 of the windshield 1. For sake of clarity, the sealing strip 27 has been omitted in FIGURE 7.

Figure 8:
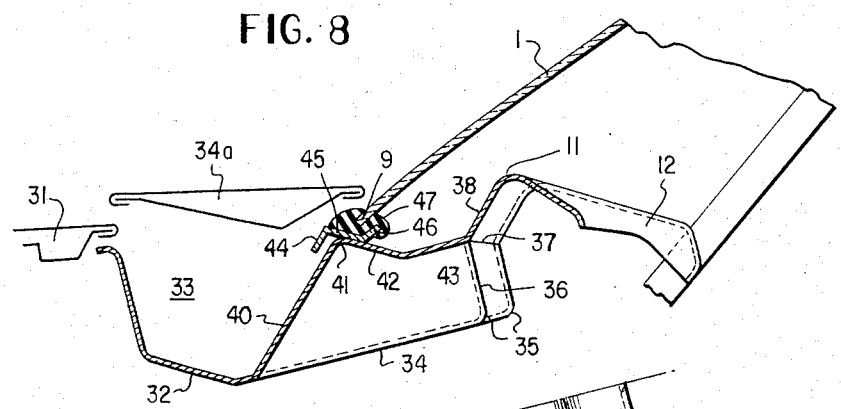
FIGURE 8 is a partial longitudinal, cross-sectional view through a sixth embodiment of a passenger motor vehicle in accordance with the present invention.
Figure 9:
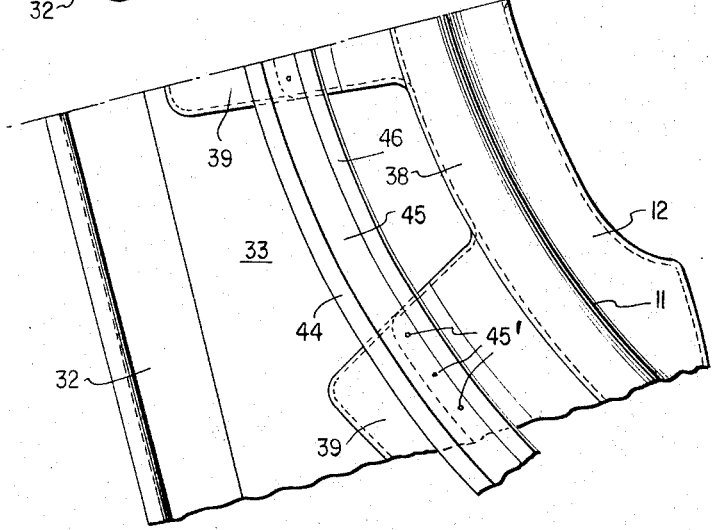
FIGURE 9 is a partial top plan view on the construction of FIGURE 8.

The embodiment according to FIGURES 8 and 9 illustrates the end of the engine hood 31. The sheet metal panel 32, corresponding to the body panel 4 of the other embodiments described above, is arranged to the rear of the engine 31. The body panel 32 is supported only in its forward area and forms a recess 33 disposed lower than the hood 31 which is covered by means of a cover 34a. From the recess 33, a sheet metal bottom part 34 rises slightly up to the bent-off place or corner 35 and extends from there as leg portion 36 slightly inclined forwardly up to the bent-off place or corner 37, a further leg portion 38 extending from corner 37 to the upper bent-off place or corner 11. The desk-like surface 12 adjoins the bent-off place 11.

The bottom sheet metal panel 34, however, does not extend with the same shape over the entire width of the vehicle. As clearly visible from FIGURE 9, individual embossments 39 arranged at a distance from one another and located considerably lower than the desk-like surface 12, are provided in this embodiment whose forward wall 40 passes over at 41 into a slightly downwardly inclined surface 42 which, in turn, is adjoined by a slightly rising surface 43 up to the bent-off place or corner 37. A Z-shaped strip 44 is placed on the surface 42 of the individual embossments 39 arranged at a distance from one another, which strip 44 is connected with the embossments 39 at 45'. This Z-shaped supporting strip 44 carries the sectional sealing member 45 which extends with a lip portion 46 thereof over the leg portion 47 of the Z-shaped strip 44 and is provided with a groove for the lower windshield rim 9 of the windshield 1. Air inlet apertures are formed between the embossments 39. The Z-shaped support 44 provided in this embodiment and possibly necessary with very large windshields lies considerably below the upper bent-off place or corner 11 and the desk-like surface 12 so that in case of impact of the heads of the passengers on the desk-like surface 12, the latter is initially deformed to a considerable extent before the head impinges against the strip 44 which might possibly be somewhat more sharp-edged but which is rendered safe by the sectional mounting and support member 45 for the pane and additionally is able to yield.

While I have shown and described several embodiments in accordance with the present invention, it is understood that the same is not limited thereto but is susceptible of numerous changes and modifications as known to a person skilled in the art. For example, the present invention is not limited to the construction of the sheet metal body panel at the windshield but may be provided in a similar or analogous manner at the side windows or especially also at the rear window of the vehicle. Furthermore, the embossments 39 according to FIGURES 8 and 9 may be provided only at the lateral ends of the windshield.

Thus, it is obvious that the present invention is not limited to the details shown and described herein but may be modified in numerous ways as known to a person skilled in the art and I therefore do not wish to be limited to the details shown and described herein but intend to cover all such changes and modifications as are encompassed by the scope of the appended claims.

I claim:

1. A sheet metal body construction for a motor vehicle having passenger space, which is disposed within the area of the lower edge of a windowpane thereof, comprising elongated body panel means extending substantially transversely to the longitudinal axis of the vehicle and disposed below the windowpane and having an end portion extending into the passenger space in a cantilever construction, being supported substantially only along one edge thereof with the lateral edges substantially unsupported, said end portion sloping downwardly in a desk-like shape in the direction toward the passengers.

2. The body panel construction according to claim 1, wherein said panel means rises slightly up to a point located a short distance to the rear of the windowpane along substantially the entire length thereof and thereafter slopes downwardly.

3. A sheet metal body construction for a motor vehicle having a passenger space, which is disposed within the area of the lower edge of the windshield thereof, comprising mounting means for said windshield, elongated body panel means extending transversely to the longitudinal axis of the vehicle and disposed below the windshield and having an end portion projecting toward the passenger space in a freely-supported, cantilever construction, being supported substantially only along one edge thereof with the lateral edges substantially unsupported, said end portion sloping downwardly in a desk-like shape in the direction toward the passengers, and said mounting means being located below said desk-like surface.

4. The body construction according to claim 3, wherein said panel means rises slightly up to a short distance to the rear of the windshield along substantially the entire length thereof and thereafter slopes downwardly.

5. The body construction according to claim 4, wherein the vehicle includes an instrument panel secured only in the lower portion thereof and extending freely in the upward direction, and wherein said body panel means overlaps from above said instrument panel.

6. The body construction according to claim 5, further comprising protective means for the knees on said instrument panel.

7. The body construction according to claim 3, wherein the vehicle includes an instrument panel secured only in the lower portion thereof and extending freely in the upward direction, and wherein said body panel means overlaps from above said instrument panel.

8. The body construction according to claim 3, wherein panel means includes embossments arranged at a distance from one another and disposed lower than said desk-like surface, said windshield resting on said embossments.

9. The body construction according to claim 8, wherein said embossments are provided only near the windshield ends.

10. The body construction according to claim 8, further comprising support means including continuous, Z-shaped rail means for supporting said windshield on said embossments.

References Cited

UNITED STATES PATENTS

| | | | |
|---|---|---|---|
| 2,855,066 | 10/1958 | Nallinger | 180—90 |
| 3,011,823 | 12/1961 | Maher | 296—84 |

BENJAMIN HERSH, *Primary Examiner.*

PHILIP GOODMAN, *Examiner.*